United States Patent [19]
Fischer et al.

[11] Patent Number: 6,132,874
[45] Date of Patent: Oct. 17, 2000

[54] FUNCTIONALIZED INORGANIC OXIDE HYDROXYLATED CARRIER AND METHOD FOR PREPARING SAME

[75] Inventors: Christian Fischer, Luzinay; Gérard Mignani, Lumiére; Christian Priou, Villeurbanne, all of France

[73] Assignee: Rhodia Chimie, Courbevoie Cedex, France

[21] Appl. No.: 09/011,576

[22] PCT Filed: Aug. 19, 1996

[86] PCT No.: PCT/FR96/01294

§ 371 Date: Apr. 28, 1998

§ 102(e) Date: Apr. 28, 1998

[87] PCT Pub. No.: WO97/08225

PCT Pub. Date: Mar. 6, 1997

[30] Foreign Application Priority Data

Aug. 22, 1995 [FR] France ................................. 95 10115

[51] Int. Cl.[7] .................................................... B32B 27/14
[52] U.S. Cl. ............................ 428/405; 428/407; 428/403
[58] Field of Search .................................. 428/405, 407, 428/403

[56] References Cited

U.S. PATENT DOCUMENTS

| | | | |
|---|---|---|---|
| 2,993,809 | 7/1961 | Bueche | 117/100 |
| 4,242,227 | 12/1980 | Nestrick et al. | 252/428 |
| 4,394,469 | 7/1983 | Stratta et al. | 523/212 |
| 5,672,422 | 9/1997 | Kanda et al. | 428/304.4 |

FOREIGN PATENT DOCUMENTS

| | | |
|---|---|---|
| 0 212 870 | 3/1987 | European Pat. Off. . |
| 38 34 949 | 4/1990 | Germany . |

*Primary Examiner*—Margaret G. Moore
*Attorney, Agent, or Firm*—Burns, Doane, Swecker & Mathis, L.L.P.

[57] ABSTRACT

The hydroxylated inorganic oxide support is functionalized by grafting at least one type of polyhydrosiloxane oil having from 10 to 200 siloxane units, the grafting being provided, on the one hand, by covalent bonds formed from a dehydrogenation/condensation reaction between Si-H groups of the polyhydrosiloxane oil and free hydroxyls of the hydroxylated support and, on the other hand, by hydrogen bonds between hydroxyls of the hydroxylated support and oxygen atoms of the polyhydrosiloxane oil, which exhibits free SiH groups.

21 Claims, No Drawings

FUNCTIONALIZED INORGANIC OXIDE HYDROXYLATED CARRIER AND METHOD FOR PREPARING SAME

The present invention relates to hydroxylated inorganic oxide supports, in particular of silica, alumina, titanium oxide and rare-earth metal oxide type, which are functionalized and capable of being used in multiple applications, in particular in the field of functionalized fillers, for example for tyres, anti-adhesive paper, RTVs (room-temperature vulcanizable elastomers), antifoaming agents and pigmentation agents in electronics. The invention also applies, for example, to the preparation of hydrophobic supports or supports for enantiomer separation or for heterogeneous catalysis. Another subject of the invention is a process for their preparation.

The combination of silicones with silica is widely used today.

The silica can serve as inorganic filler intended to improve the mechanical properties of the silicones. This application involves the strong interactions which exist between the silanols of the silica and the Si-O-Si groups. In this case, it is also known to modify these interactions by treating the surface of the silica, for example with the help of $Me_3Si$ groups, giving a degree of hydrophobicity to the silica which facilitates the incorporation of the filler in the silicone or in polymer matrices.

Attempts have also been made to functionalize the silica with the help of linear silicones, in order to obtain a functionalized silica having specific surface characteristics conferring useful properties on the silica.

T. Suhara et al., Colloids and Surfaces, Physicochemical and Engineering Aspects, 95 (1995), 1-9, thus use a tetramethylcyclotetrasiloxane (TMCTS) to coat the particles of a silica powder. The linear silicone is deposited on the silica by a vapour-phase deposition method at 80° C., which enables covering of the silica by the silicone to be obtained. The Si-H groups of the polymethylsiloxane layer formed at the surface of the silica particles can react with various functional derivatives by a hydrosilylation reaction. It is thus possible to increase the dispersibility by crafting olefins or alcoholic hydroxyl groups, to form a matrix for anion exchange by grafting ionic diethylamino groups or to make the surface of the silica hydrophobic by grafting groups such as diethylamino or octadecyl groups. The writers describe the reaction of the silica, coated with its polymethylsiloxane layer, with p-chloromethylstyrene in the presence of a platinum-based catalyst and then with an N,N-dimethyl-n-alkylamine. Depending on the length of the grafted carbon chain, the final product can be hydrophobic or hydrophilic. This process takes advantage of the volatile nature of TMCTS at high temperature and is not applicable to silicones having a larger number of units.

The article by H. W. Stuurman et al., in Chromatographia, Vol. 25, No. 4, April 1988, relates to the preparation of a stationary silica phase which is useful in enantiomeric separation. The process described provides for a partial hydrosilylation reaction of a siloxane oligomer or polymer (for example having 22 or 35 SiH units on the silicone chain) and of quinine in the presence of a platinum-based catalyst and then for the chemical bonding of the compound obtained above to a silica gel (see also W. Röder et al., Journal of High Resolution Chromatography & Chromatography Communications, Short Communication 10710, Vol. 10, 665–667, December 1987). This process does not allow a homogeneous coating to be obtained and is not necessarily applicable to all types of functionalization, in particular molecules of significant size, without modifying the reactivity of the Si-H units of the silicone, just as it limits the amount of molecules which can be grafted.

Patent Application FR-A-2,666,999 describes a process for obtaining a silica-based support which is useful in analytical or preparative chromatography, in particular in high performance liquid chromatography, in solid/liquid extraction, in heterogeneous catalysis or in capillary electrophoresis. The process comprises the grafting onto the silica of hydrosilanes containing 1 silicon atom in the presence of a catalyst which is a metal complex, so as to obtain 100% of Si-O-Si bonds.

For applications in separative chromatography, a frequent approach was to react a completely hydroxylated silica with triorganochlorosilanes according to a silanization reaction resulting in bonds of organosiloxane type. The method generally comprises the catalytic addition of an SiH unit to an end olefin, the combination forming the silanization reactant, namely the triorganochlorosilane. The main disadvantage of this approach is related to the use of chlorosilanes, making the final separation between functionalized silica and reaction residues difficult. For its removal, the hydrochloric acid formed must be trapped by a base, such as pyridine, resulting in a solid hydrochloride which is difficult to remove. A mixture of two solids is then obtained, the separation of which generally makes the process unacceptable industrially (see, for example, J. E. Sandoval and J. J. Pesek in Anal. Chem., 1989, 61, 2067–2075).

Patent Application WO-A-94 12275 describes the preparation of optically active adsorbents which are useful in the chromatographic separation of enantiomers. A tartaric acid derivative is polymerized as a network on a silica gel. In particular, the derivative is polymerized by hydrosilylation in the presence of hydrosilanes or hydrosiloxanes of general formula

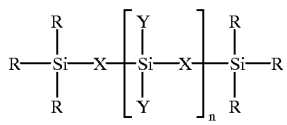

in which R is an alkyl group having from 1 to 4 carbon atoms or H or a mixture of these, X is $(CH_2)_m$ or O, Y is R or the $-O-Si(R)_3$ group, n is an integer from 0 to 3000 and m an integer from 1 to 10. The reaction is carried out in the presence of a catalyst formed from a metal complex at temperatures ranging from 50 to 180° C. In the case of hydrosiloxanes, a pretreatment is provided which introduces vinyl units at the surface of the silica. This process is applied to one type of functionalization.

Patent Application EP-A-0,212,870 describes the preparation of fillers coated with silicone oils containing Si-H units, it being possible for these structures containing Si-H units subsequently to undergo a hydrosilylation reaction, in order to introduce specific properties. In the procedure described, the silicone oil containing Si-H units is added to the inorganic filler and dehydrogenation/condensation of the Si-H units with residual water takes place to form Si-O-Si bridges between silicone chains. This way of operating does not allow covalent bonds between the inorganic filler and the silicone oil to be obtained. The oil is simply adsorbed at the surface of the filler.

An objective of the present invention is to overcome the inadequacies and disadvantages of the prior processes and supports by providing a functionalization process and hydroxylated inorganic oxide supports functionalized with the help of silicone oils, so as to have good covering of the support while leaving an optimum amount of SiH units available for the grafting of advantageous molecules.

Another objective of the invention is to provide a process allowing the ready grafting of various molecules, even of large size.

Yet another objective of the invention is to provide a process which is easy to implement and which in particular makes it possible readily to recover the functionalized support, for example by simple filtration or centrifuging, and which avoids the presence of organic or inorganic salts at the surface of the filler.

Yet another objective of the invention is to provide a functionalized support which has great potentialities for the grafting of various molecules of varied applications.

Yet another objective of the invention is to provide a functionalized and grafted support having a long lifetime and high stability with respect to grafted molecules, in particular high stability towards hydrolysis.

A subject of the invention is therefore a hydroxylated inorganic oxide support functionalized by grafting at least one type of polyhydrosiloxane oil having from 10 to 200 siloxane units, the grafting being provided, on the one hand, by covalent bonds formed from a dehydrogenation/condensation reaction between Si-H groups of the polyhydrosiloxane oil and free hydroxyls of the hydroxylated support, for example free silanolo where silica is used as support and, on the other hand, by hydrogen bonds between hydroxyls of the hydroxylated support and oxygen atoms of the polyhydrosiloxane oil, which retains free SiH groups. After. grafting, free Si-H groups indeed remain, the amount of which can be adjusted according to the operating conditions (temperature, duration of treatment).

More particularly,,the polyhydrosiloxane oil has from 30 to 60 siloxane units, preferably approximately 50.

Before they are grafted onto the support, the polyhydrosiloxane oils preferably correspond to the general formula:

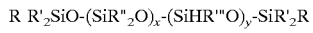

R R'$_2$SiO-(SiR"$_2$O)$_x$-(SiHR'"O)$_y$-SiR'$_2$R with

R=H or R'

R', R" and R'"=C$_1$ to C$_6$ alkyl, preferably C$_1$ alkyl, or aromatic, preferably phenyl, if x is equal to 0, y=10 to 200 if x is other than 0, x+y=10 to 200.

The polyhydrosiloxane oils can also be mixed oils containing SiH and SiOR functional groups, R preferably being methyl or ethyl.

The hydroxylated support is any useful inorganic support but is preferably selected from the group consisting of silica, alumina, titanium oxide (anatase or rutile), rare-earth metal oxides, zinc oxide and magnesium oxide. It relates in particular to calcination, precipitation or chromatography silica.

The coating with polyhydrosiloxane exhibiting free SiH groups enables advantageous molecules to be grafted. In this case, the support additionally exhibits molecules X bonded to the Si atoms (not involved in a covalent bond with the inorganic oxide) of the polyhydrosiloxane oil, according to the following scheme:

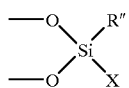

The molecule X can be selected from molecules known to the person skilled in the art to be useful in a given application.

In particular, the molecule X can be an alkyl group preferably having from 6 to 25 carbon atoms or a polybutadienyl group (preferably Mn=1000 to 20,000), in order to obtain a hydrophobic support and/or a reactive support, in the case of polybutadiene.

Further information and other non-limiting examples of molecules X are given later.

Another subject of the invention is a process for the functionalization of a hydroxylated inorganic oxide support, in order to obtain a support as defined above, in which this support is reacted with at least one polyhydrosiloxane oil containing Si-H units and having from 10 to 200 siloxane units, in the presence of a dehydrogenation/condensation catalyst, so that the reaction takes place with evolution of hydrogen.

The catalyst is preferably selected from the group consisting of catalysts based on platinum, rhodium, ruthenium, cobalt, tin (in particular dibutyltin dilaurate) or titanium and inorganic bases (NaOH, KOH, and the like) and organic bases (pyridine, and the like). The catalyst is in particular a platinum-based catalyst, in particular of Karstedt type Pt$_2$(ViSiMe$_2$-O-SiMe$_2$Vi)$_3$ or H$_2$PtCl$_6$.6H$_2$O. Mention may also be made, in particular, of RhCl(P(C$_6$H$_5$)$_3$)$_3$, Ru$_3$(CO)$_{12}$, Co$_2$(CO)$_8$, (C$_6$H$_5$)$_2$Ti (CH$_3$)$_2$ or (C$_6$H$_5$)Ti(CH$_3$)$_3$.

The reaction is generally carried out at a temperature of between 50 and 200° C., preferably between 100 and 150° C.

It can be carried out in liquid medium with the catalyst in solution in a solvent (for example toluene, xylene, cyclohexane or methylcyclohexane, toluene being preferred) or neat with the catalyst dissolved in the mass of reactants.

The grafting reaction can be characterized by diffuse reflection infra-red spectrometry (FTIR) on a Biorad FTS45A device and by solid $^{29}$Si NMR (nuclear magnetic resonance).

In accordance with the invention, it was possible to demonstrate the decrease in the free silanols (for example 3740 cm$^{-1}$) in conjunction with the decrease in the Si-H groups of the silicone oil (for example 2170 cm$^{-1}$) and the solid $^{29}$Si NMR unambiguously showed the presence of the groups of type

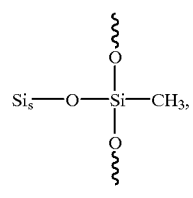

s = silica

In a second step, it is possible to graft, to the support formed from the inorganic oxide and from the polyorganosiloxane oil, molecules containing an end unsaturated unit, which can in particular be a linear or branched α-unsaturated hydrocarbon having from 6 to 25 carbon atoms, preferably a C$_6$ to C$_{12}$ hydrocarbon, according to a hydrosilylation reaction catalysed by organometallic platinum, rhodium or cobalt complexes. It is possible, in particular, to graft a C$_6$-C$_{25}$, in particular C$_6$-C$_{12}$, 1-alkene having an end unsaturated unit.

This makes it possible to obtain hydrophobic supports or to confer a degree of compatibility with respect to a matrix such as an elastomeric matrix.

For example, in the case of the functionalization with 1-octene, the synthetic and functionalization scheme, from the reaction between the silica and the polyhydrosiloxane oil, is as follows:

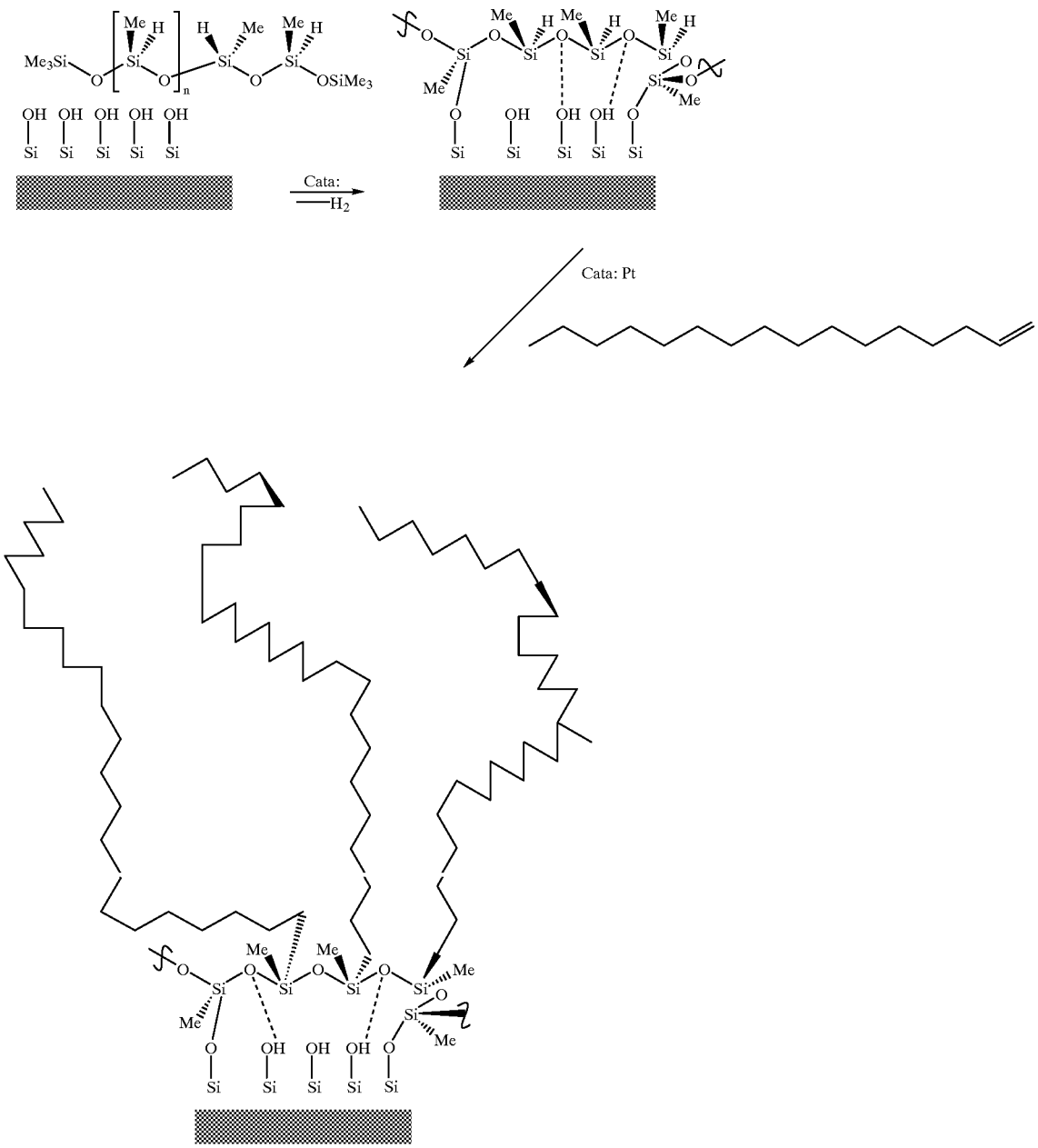

It is also possible to graft an α,ω-diene R, in particular with R=$C_2$ to $C_4$, so as to confer a hydrophobic nature, compatibility with respect to a matrix or reactivity via the remaining unsaturated units, for example making possible the addition of an advantageous group, in particular a carbon-containing or sulphur-containing radical.

It is also possible to graft polyenes, in particular of polybutadiene type, in order to obtain a hydrophobic and reactive support.

It is also possible to deposit metals of the [Pd·] type according to L. Fry, J. Chem. Soc. Chem. Com., 1993, 997, via the reduction by the Si-H units of $PdCl_2$ to [Pd·]. The target is therefore heterogeneous catalysis applications, for example in hydrogenation or carbonylation reactions.

It is also possible to graft chiral molecules for the preparation of supports for enantiomeric separation. It is in particular possible to graft quinine derivatives, such as the trimethylsilylated derivative:

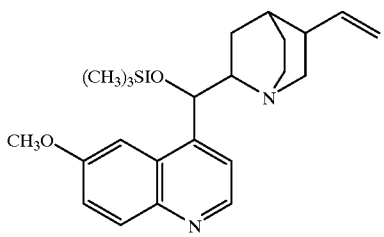

or chiral lactic derivatives of type:

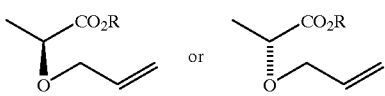

with in particular R=CH$_3$, ethyl or benzyl.

It is also possible to graft complexing molecules for transition metals, in particular of

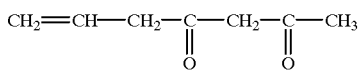

type.

It is also possible to graft photodissociable molecules, in particular of spirobenzopyran type: see M. Ueda et al., J. Mater. Chem., 1994, 4(6), 883–889.

The subject of the invention is therefore the grafting of various molecules which are commonly used in the functionalization of supports based on inorganic oxides, for the applications indicated above.

An additional subject of the invention is therefore the supports formed from the inorganic oxide and from the polyorganosiloxane oil and on which the above molecules have been grafted.

EXAMPLE 1
Synthesis of silica functionalized by polyhydrosiloxane groups.

100 g of combustion silica (A200) are introduced into a 2-liter glass Sovirel reactor while stirring under a nitrogen stream. 8.25 g of a polyhydrosiloxane oil (1.55% equiv./SiH) are then introduced dropwise (45 min) at room temperature via a dropping funnel. After stirring for 30 min, 2 g of a platinum catalyst (0.3% Pt, by mass) in solution in hexane are added. The temperature is then raised for 2 hours to 120° C., the reactor being placed under vacuum (15 mm Hg) for the final 15 minutes. The IR spectrum of the product obtained is run and compared with that of the starting silica (A 200). It is observed that the interaction of the oil with the surface essentially takes place at the free silanols of the silica (ν OH: 3700 cm$^{-1}$), bands at 2966 and 2909 cm$^{-1}$ (ν C—H) indicating the presence of the oil with its residual Si-H groups (ν Si-H : 2169 cm$^{-1}$)

EXAMPLE 2
Functionalization of the silicas containing polyhydrosiloxane groups.
a) Functionalization by n-octene.

2 g of silica functionalized by polyhydrosiloxane groups of Example 1, 50 ml of dry toluene and 7.8 g of n-octene (0.07 mol) and 10 μl of Karstedt catalyst (21093), containing 12 mass % of platinum, are introduced into a 100-ml three-necked flask under nitrogen. The mixture is allowed to react for 16 h at 90° C. It is allowed to return to room temperature and is filtered on a filter paper. The filter residue is washed with 1 l of dry toluene and 1 l of hexane. The filter residue is then dried under pump vacuum (1 mm Hg) for 4 h at 25° C. 1.7 g of a white solid are recovered. The IR spectrum of the final product is run. A large decrease in the vibrational band for the Si-H units is observed. The microanalytical results show: %C=3.06 and %H=0.9, which makes it possible to estimate a level of octyl units of the order of 1.2 octyl units/nm$^2$ if a specific surface of 160 m$^2$/g is considered.

b) Functionalization by polybutadiene.

2 g of silica functionalized by polyhydrosiloxane groups of Example 1, 50 ml of dry toluene and 8.3 g of Ricon 156 polybutadiene (Mn: 2540, Mw : 2920, CH=CH: 65%, CH=CH$_2$: 35%) and 10 μl of Karstedt catalyst (21093), containing 12 mass % of platinum, are introduced into a 100-ml three-necked flask under nitrogen. The mixture is allowed to react for 16 h at 90° C. It is allowed to return to room temperature and is filtered on a filter paper. The filter residue is washed with 1 l of dry toluene and 1 l of hexane and is then dried under pump vacuum (1 mm Hg) for 4 h at 25° C. 1.6 g of a white solid are recovered. The IR spectrum of the final product is run. A large decrease in the vibrational band for the Si-H units is observed. The microanalytical results show: %C 4.58 and %H =1.02.

EXAMPLE 3
Synthesis of precipitation silica functionalized by polyhydrosiloxane groups.

100 g of precipitation silica (Z 175 MP) are introduced into a two-liter glass Sovirel reactor while stirring under a nitrogen stream. 8.25 g of a silicone oil containing Si-H units of general formula: Me$_3$SiO(MeHSiO)$_{50}$SiMe$_3$ (1.55% equiv./Si-H) are introduced dropwise over 45 min at room temperature using a dropping funnel.

After stirring for approximately 30 min, 2 g of a Karstedt catalyst solution (0.3% of Pt by mass) are added. The temperature is then raised to 120° C. for 2 h, the reactor being placed under vacuum (15 mm Hg) for the final 15 minutes. The IR analyses show that the interaction of the silicone oil with the surface essentially takes place at the free silanol units of the silica. The IR analysis shows that ~47 % of the Si-H units introduced remain, i.e. ~0.055 mol of Si-H units/100 g of filler. The microanalysis shows the following results: %C : 3.35, %H : 1.55.

EXAMPLE 4
Functionalization reaction: 1-octene.

5.00 g of the product from Example 3, 10.00 g of 1-octene (0.089 mol), 100 ml of dry toluene and 150 ppm of [Pt] (Karstedt catalyst) are introduced at room temperature into a 250-ml reactor surmounted by a reflux condenser. The whole assembly is brought to 100° C. The mixture is allowed to react for 16 h at this temperature. It is allowed to return to room temperature and the silica is filtered off, washed with 500 ml of toluene and 1200 ml of hexane and then dried for 16 h in an oven under nitrogen at ~40° C. 4.9 g of a white solid are recovered, the elemental analysis of which solid is as follows: %C : 4.84 and %H : 1.60. The IR analysis shows this reactivity of the Si-H units.

EXAMPLE 5
Functionalization reaction: polybutadiene.

5.00 g of the product from Example 3, 10.00 g of polybutadiene (Ricon 156 type, Mn: 2540, Mw : 2920, CH=CH : 65%, CH=CH$_2$: 35%), 100 ml of dry toluene and 150 ppm of [Pt] (Karstedt catalyst) are introduced at room temperature into a 250-ml reactor surmounted by a reflux condenser. The whole assembly is brought to 100° C. The mixture is allowed to react for 16 h at this temperature. It is allowed to return to room temperature and the silica is filtered off, washed with 500 ml of toluene and 1200 ml of hexane and then dried for 16 h in an oven under nitrogen at −40° C. 4.8 g of a white solid are recovered, the elemental analysis of which solid is as follows: %C: 5.60, %H: 1.65. The IR analysis shows the reactivity of these Si-H units.

EXAMPLE 6

Functionalization reaction: 1,5-hexadiene.

5.00 g of the product from Example 3, 10.00 g of 1,5-hexadiene (0.12 mol), 100 ml of dry toluene and 150 ppm of [Pt] (Karstedt catalyst) are introduced at room temperature into a 250-ml reactor surmounted by a reflux condenser. The whole assembly is brought to 100° C. The mixture is allowed to react for 16 h at this temperature. It is allowed to return to room temperature and the silica is filtered off, washed with 500 ml of toluene and 1200 ml of hexane and then dried for 16 h in an oven under nitrogen at ~40° C. 4.99 g of a white solid are recovered, the elemental analysis of which solid is as follows: %C: 7.0, %H: 2.0.

EXAMPLE 7

Functionalization reaction: polybutadiene.

426.6 g of a silica containing Si-H units (H68+Silica Z 1165 MP containing 0.043 mol of Si-H units/100 g of silica), 400 g of polybutadiene (Ricon 156 type, Mn: 2540, Mw : 2920, CH=CH : 65%, CH=CH$_2$ : 35%), 100 ml of dry toluene and 150 ppm of [Pt] (Karstedt catalyst) are introduced at room temperature into a 2-1 reactor surmounted by a reflux condenser. The whole assembly is brought to 100° C. The mixture is allowed to react for 16 h at this temperature. It is allowed to return to room temperature and the silica is filtered off, washed with 3 l of toluene and 1 l of cyclohexane and then dried for 5 h at 80–110° C. under 1 mm of Hg. 546 g of a white solid are recovered, the elemental analysis of which solid is as follows: %C: 7.15, %H: 1.75. Quantitative determination of Si-H units by volumetric analysis shows a content of 32×10$^{-3}$ mol of Si-H units/100 g of filler. It is then subjected to treatment with dry ethanol (50 ml) in the presence of Karstedt catalyst (100 ppm) at 60° C. for 16 h. After filtering and drying under pump vacuum (1 mm of Hg, 5 h at 25° C.), 530 g of a white solid are obtained, which solid contains 4×10$^{-3}$ mol of Si-H units/100 g of filler. The elemental analysis shows %C: 6.65, %H : 1.70. The IR analysis shows a very large decrease in the amount of the remaining Si-H units.

What is claimed is:

1. Hydroxylated inorganic oxide support functionalized by grafting at least one type of polyhydrosiloxane oil having from 10 to 200 siloxane units, the grafting being provided, on the one hand, by covalent bonds formed from a dehydrogenation/condensation reaction between Si-H groups of the polyhydrosiloxane oil and free hydroxyls of the hydroxylated support and, on the other hand, by hydrogen bonds between hydroxyls of the hydroxylated support and oxygen atoms of the polyhydrosiloxane oil, which exhibits free SiH groups.

2. Support according to claim 1, wherein the polyhydrosiloxane oil has from 30 to 60 siloxane units.

3. Support according to claim 1, wherein the polyhydrosiloxane oils correspond to the general formula:

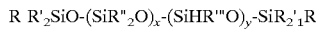

with

R=H or R"

R', and R" and R'"=C$_1$ to C$_6$ alkyl, or aromatic, if x is equal to 0, y=10 to 200 if x is other than 0, x+y=10 to 200.

4. Support according to claim 1, wherein at least one of the at least one type of polyhydrosiloxane oil contains SiH and SiOR functional groups, R being methyl or ethyl.

5. Support according to claim 1, wherein the hydroxylated support is selected from the group consisting of silica, alumina, titanium oxide and rare-earth metal oxides.

6. Support according to claim 5, wherein said support is calcination silica or precipitation silica.

7. Support according to claim 1, wherein molecules containing an end unsaturated unit are grafted to said support formed from the inorganic oxide and from the polyorganosiloxane oil through said end unsaturated unit, thereby saturating said end unsaturated unit.

8. Support according to claim 7, wherein the molecules containing an end unsaturated unit are linear or branched α-unsaturated hydrocarbons having from 6 to 25 carbon atoms.

9. Support according to claim 1, wherein molecules selected from the group consisting of: α,ω-diene, polyene, metals, chiral molecules, complexing molecules for transition metals and photodissociable molecules, are grafted to the support formed from the inorganic oxide and from the polyorganosiloxane oil.

10. Support according to claim 1, wherein the support is reacted with the at least one type of polyhydrosiloxane oil, in the presence of a dehydrogenation/condensation catalyst, so that the reaction takes place with evolution of hydrogen.

11. Support according to claim 10, wherein the catalyst is selected from the group consisting of catalysts based on platinum, rhodium, ruthenium, cobalt, titanium and mixtures thereof.

12. Process for the functionalization of a hydroxylated inorganic oxide support, in order to obtain a support according to claim 1, wherein the support is reacted with at least one polyhydrosiloxane oil containing Si-H units and having from 10 to 200 siloxane units, in the presence of a dehydrogenation/condensation catalyst, so that the reaction takes place with evolution of hydrogen.

13. Process according to claim 12, wherein the catalyst is selected from the group consisting of catalysts based on platinum, rhodium, ruthenium, cobalt, titanium and mixtures thereof.

14. Process according to claim 13, wherein the catalyst is a platinum catalyst.

15. Process according to one of claim 12, the reaction is carried out at a temperature of between 50 and 200° C.

16. Process according to one of claim 12, wherein the reaction is carried out in liquid medium with the catalyst in solution in a solvent.

17. Process according to one of claim 12, the reaction is carried out neat with the catalyst dissolved in the mass of reactants.

18. Process according to one of claim 12, wherein molecules containing an end unsaturated unit are grafted to said support formed from the inorganic oxide and from the polyorganosiloxane oil through said end unsaturated unit, thereby saturating said end unsaturated unit.

19. Process according to claim 18, wherein the molecule containing an end unsaturated unit is a linear or branched α-unsaturated hydrocarbon having from 6 to 25 carbon atoms.

20. Process according to one of claims 12 wherein molecules selected from the group consisting of:

α, ω-diene, polyene, metals, chiral molecules, complexing molecules for transition metals photodissociable molecules, are grafted to the support formed from the inorganic oxide and from the polyorganosiloxane oil.

21. Support obtained by the implementation of the process according to claim 12.

* * * * *